Dec. 19, 1922.
F. R. LOEFFLER.
LUBRICATING JOURNAL BOX FOR SHAFT COUPLINGS.
FILED JAN. 21, 1920.
1,439,010.
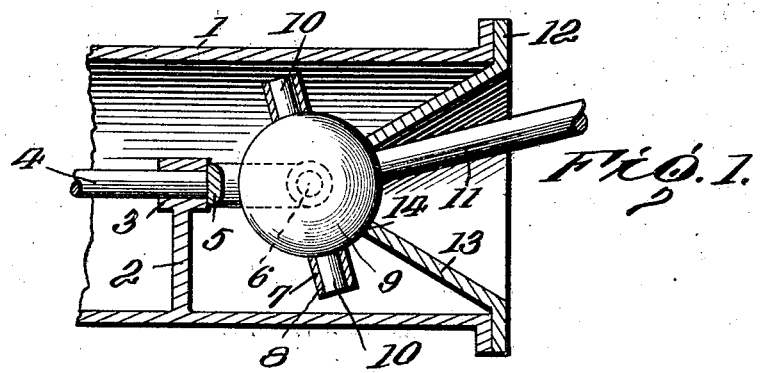
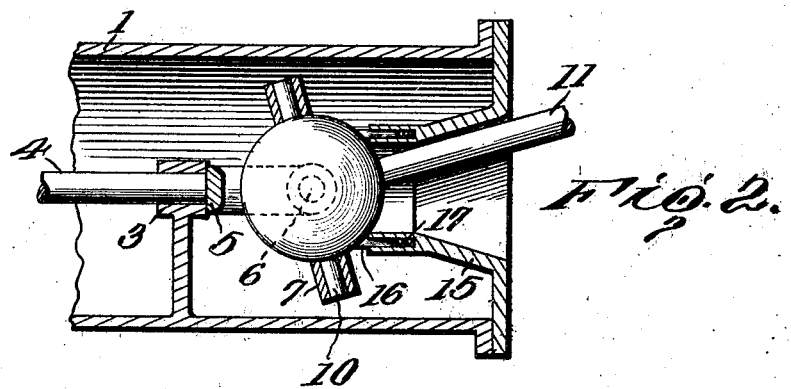
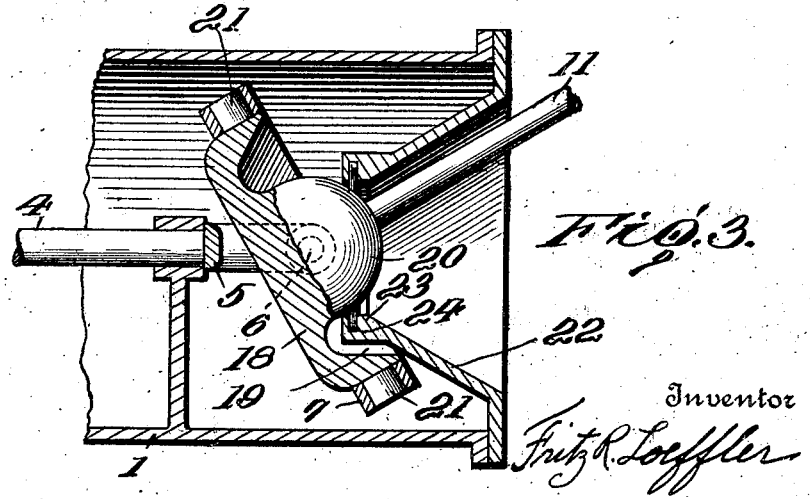

Patented Dec. 19, 1922.

1,439,010

UNITED STATES PATENT OFFICE.

FRITZ R. LOEFFLER, OF HEIDELBERG, GERMANY.

LUBRICATING JOURNAL BOX FOR SHAFT COUPLINGS.

Application filed January 21, 1920. Serial No. 353,005.

*To all whom it may concern:*

Be it known that I, FRITZ R. LOEFFLER, a citizen of Germany, residing at Heidelberg, Germany, have invented certain new and useful Improvements in Lubricating Journal Boxes for Shaft Couplings, of which the following is a description, reference being had to the accompanying drawings and to the figures of reference marked thereon.

This invention relates to new and useful improvements in shaft couplings and more particularly to means for forming a sealing joint with a casing enclosing the same, and from which the swinging shaft projects.

One of the objects of the present invention is to provide a new and improved shaft coupling connecting the drive and driven shafts, wherein the swinging shaft is provided with a curved surface, preferably in the form of a sphere upon which is pivotally mounted one member of the coupling which in turn is pivotally connected in the usual manner to the other shaft.

A further object of this invention is to provide a universal coupling for the drive and driven shafts, wherein a curved surface mounted within the joint concentric to its moving center to which the swinging shaft is connected forms a permanent substantial sealing closure with the walls of the enclosing casing through which the swinging shaft projects.

These and other objects will in part be obvious and will in part be hereinafter more fully described.

Referring more particularly to the drawings:—

Figure 1 is a sectional side view of one form of my improved shaft coupling showing the curved surface forming the closure for the casing opening through which the swinging shaft projects;

Fig. 2 is a similar view showing a modification of the end of the casing which bears against the swinging curved surface, and Fig. 3 is a modified form of the curved surface showing the same bell-shaped instead of spherical.

In general, the invention comprises a universal joint connecting the shafts, the swinging shaft being provided with a ball or curved surface arranged in the interior of the joint concentric to its moving center. Enclosing this joint is a housing or casing, the walls of which provide an opening through which the swinging shaft projects, and the walls of this opening are arranged to make a closing or sealing joint with the curved surface whereby not only a dust-proof and completely closed casing is formed about the joint, but a seal is also provided about the swinging shaft which prevents the outflow of the lubricating oil contained in the casing. By placing this curved or balled surface within the joint it is possible to reduce to a minimum the amount of surface contact with the housing that has to be sealed, and also reduces to a minimum the circumferential speed of the movement of the sealed surfaces which rub on each other, so that friction is reduced to a minimum.

Referring more particularly to the accompanying drawings, the enclosing casing 1 which may be filled with oil is provided with an integral upwardly projecting partition or arm 2 forming a bearing 3 for the inner end of the drive shaft 4. This drive shaft 4 is connected in driving relation to a drive shaft by means of a universal coupling of any desired type. In the present instance, this coupling is illustrated as the usual gimbal joint type provided with the yoke 5 connected to the before mentioned drive shaft 4, and this yoke 5 is pivoted at 6 to the gimbal ring or member 7 recessed at 8 to receive pivotal pins 10 of an inner member 9 which is formed with a curved surface concentric to the moving center of the joint. In the form shown in Fig. 1, this curved surface takes the form of a sphere 9 and to one portion of the member having this curved surface is connected either integrally, detachably or otherwise, a driven or swinging shaft 11.

At this portion of the housing the same is formed with inwardly projecting conical walls 12 shaped to permit the free swinging of the shaft, and the ends 13 of these walls rest upon the smooth curved surface of the member 10 to provide a seal for the casing about the shaft. If desired, this conical portion of the casing may be made of resilient material to press yieldingly against the curved surface.

In Fig. 2 a slightly different arrangement of sealing is shown. In this instance, the flare 15 in the opening of the casing walls about the swinging shaft is not so pronounced. The ends of the walls about the curved surface are provided with a special sealing ring 10. Said ring is seated in a recess in the ends of these walls and pressed normally against the curved surface by means of a spring 17. This ring serves especially to take up any wear and thus maintain the seal.

Instead of a sealing ring being pressed in a direction parallel with the axis of the driving shaft 4 as in Fig. 2, the construction shown in Fig. 3 may be provided, in which the sealing ring 24 is forced against the curved surface 20 in a plane at right angles to the axis of said shaft 4. In this instance, since the sealing pressure is in a direction at an angle to the plane of the ring 24, the latter can be made elastic as in case of sealing rings for pistons. With this latter arrangement, the special advantage is reached that any inaccuracy in relation to the axis of the ball and cone can be overcome. In case the curved surface 20 is spherical or is larger than a hemisphere, the ring 24 can be set at the center of the sphere which makes any axial sealing pressure unnecessary. It is also obvious that instead of one ring, several can be used. It is further obvious that the described sealing arrangement which allows a general movement in all directions of the swinging shaft may likewise be moved to seal a shaft that is swinging in one plane only.

In order to increase the angle through which the shaft may swing, the arrangement shown in Fig. 3 may be used. In this construction, the curved surface 20 with which sealing contact may be made is extended up to or even greater than a hemisphere. This is accomplished by forming the member having the curved sealing surface bell-like, the rims of the bell portion being enlarged and turned backwardly to form a thickened rim, from the periphery of which project the two pivotal pins 10 fitting in the recesses of the gimbal ring. The curved sealing surface 20 is formed as a part of this inner member and is extended as above noted, to or greater than a hemisphere, the center of said sphere being concentric to the moving center of the joint. The rim of the bell is preferably undercut as at 19 to permit a wider range of movement of the sealing ring 24 on the sealing surface 20.

It is obvious that changes in the details of construction and the shaping of the parts may be made without departing from the spirit of the invention as set forth in the appended claims.

Having thus described the invention, what I claim as new and desire to secure by Letters-Patent, is:—

1. In a device of the character described, drive and driven shafts, a universal coupling connecting the same, a stationary housing enclosing said coupling, the walls of which form an opening for the projection of one of said shafts, said coupling including a curved surface located within the joint concentric to its moving center and engaging the walls of said opening for closing said opening.

2. In a device of the character described, drive and driven shafts, a universal coupling connecting the same, a stationary housing enclosing said coupling, the walls of which form an opening for the projection of one of said shafts, said coupling including a member pivotally connected to one shaft, and means connected to and located within said member and forming a curved surface bearing against the walls of said opening to close the same, said means having a connection to the other shaft.

3. A universal coupling comprising drive and driven shafts, pivotal connections universally connecting said shafts, a stationary housing enclosing said connections, the walls of which form an opening for the projection of one of said shafts, said connections including a spherical surface located interiorly thereof and bearing against the walls of said opening to close the same.

4. A device of the class described comprising a drive shaft, a swingable driven shaft provided with a ball surface, a member pivotally mounted on the exterior of said ball surface, a second member pivotally connected to said first member, a drive shaft connected to said second member, an enclosing stationary casing provided with an opening for the projection of said swingable shaft, the walls of said casing at said opening bearing against said ball surface to form a closure for said casing about said swinging shaft.

5. A device of the class described comprising a drive shaft, a driven shaft, a universal coupling connecting said shafts, one of said shafts including a curved surface disposed within said coupling, an enclosing casing providing an opening about one of said shafts, the walls of said opening engaging said curved surface to close said opening around said shaft.

In testimony whereof, I affix my signature.

FRITZ R. LOEFFLER.